(12) United States Patent
Qin et al.

(10) Patent No.: US 6,728,847 B1
(45) Date of Patent: Apr. 27, 2004

(54) NETWORK BACKUP/RECOVERY SYSTEM AND METHOD REGARDING THE SAME

(75) Inventors: Simon Qin, Chongqing (CN); Pei Hu Lin, Taipei (TW)

(73) Assignee: FarStone Technology, Inc., Irvine, CA (US)

( * ) Notice: Subject to any disclaimer, the term of this patent is extended or adjusted under 35 U.S.C. 154(b) by 0 days.

(21) Appl. No.: 09/717,059

(22) Filed: Nov. 22, 2000

(30) Foreign Application Priority Data

Nov. 14, 2000 (TW) .................................. 89124112 A

(51) Int. Cl.[7] .............................................. G06F 12/16
(52) U.S. Cl. ........................ 711/162; 707/204; 709/203
(58) Field of Search ................................ 707/202, 204; 709/201, 202, 203; 711/161, 162; 714/4, 15, 19

(56) References Cited

U.S. PATENT DOCUMENTS

| | | | | |
|---|---|---|---|---|
| 5,644,766 A | * | 7/1997 | Coy et al. | 707/204 |
| 5,966,730 A | * | 10/1999 | Zulch | 711/162 |
| 5,978,911 A | * | 11/1999 | Knox et al. | 713/1 |
| 6,182,086 B1 | * | 1/2001 | Lomet et al. | 707/202 |
| 6,205,558 B1 | * | 3/2001 | Sobel | 714/15 |
| 6,243,716 B1 | * | 6/2001 | Waldo et al. | 707/202 |
| 6,260,069 B1 | * | 7/2001 | Anglin | 709/229 |

* cited by examiner

*Primary Examiner*—Gary Portka
(74) *Attorney, Agent, or Firm*—Birch, Stewart, Kolasch & Birch, LLP

(57) ABSTRACT

A network backup/recovery system is provided which can perform backup operation and/or recovery operation in a computer system, so as to backup data and system configurations and/or recover from a system crash, which can also minimize time consumption and cost. A network backup/recovery system backs up data and immediately returns a storage device to a preceding state. The network backup/recovery system comprises a client management part for controlling at least one client and a server management part for controlling a server and monitoring each using condition of the clients. The server management part sends a predetermined message to the client management part according to each using condition of the clients; and the client management part involves implementing a predetermined backup/recovery procedure according to the received predetermined message.

10 Claims, 4 Drawing Sheets

NETWORK BACKUP/RECOVERY SYSTEM AND METHOD REGARDING THE SAME

BACKGROUND OF THE INVENTION

1. Field of Invention

The present invention relates to a backup/recovery technique for a computer system. More particularly, the present invention relates to a network backup/recovery system, enables backup and/or recovery for protecting the computer system thoroughly.

2. Description of Related Art

The protection for the computer system in the public place is an important issue for a network administrator at present. In general, the public environments need the read only purpose for computer system, to avoid the damage from the user purposefully or involuntarily.

For example, the first kind of public environment is public inquiring computer system, Internet coffee shop, or the like. The computers are placed in the public place and needs to be administered, because they are easy to be destroyed. Secondly, the public environment refers to the school, where needs to set a plurality of computers to work in a certain state repeatedly. In the public place, the network administrator for the computer system demands a fixed and a stable using environment to protect the system in the normal state efficiently.

The conventional backup/recovery software, although having the backup/recovery function, wastes a lot of time executing the function, and needs the network administrator himself to operate hundreds of the client computers one by one. It is a difficult task. Referring to FIG. 1, a flowchart shows the conventional backup/recovery software accomplishing its mission. As shown in FIG. 1, the mission is to enable the recovery function for all of the client computers. First, the network administrator needs to accomplish the operation at the first client computer. Then, he goes to the second client computer to accomplish it. Finally, he keeps on going to the front of the n-th client computer to accomplish the entire mission. Assuming that the recovery operation for each client computer needs 3 minutes, then 300 minutes are needed for 100 sets of client computers, and it costs a long period of time.

For example, the conventional backup/recovery software, such as the Ghost software developed by Symantec Corporation, needs the network administrator to go to the front of each client computer to execute the Ghost backup program so as to backup data for the user for backup procedure. It is a single task and takes about 8 minutes per Gigabyte, in general. Besides, the recovery procedure also needs the network administrator to go to the front of each client computer to execute the Ghost recovery program. Prior to this, the network administrator has to boot the operating system beforehand.

FIGS. 2 and 3 illustrate two operating flowcharts showing the use of the Ghost software executing a backup operation and a recovery operation respectively. As shown in FIG. 2, the network administrator goes to the front of each client computer to operate the disk operating system (DOS) and then executes the Ghost backup program to backup data stored in the selected hard disk/partition to a file F. As shown in FIG. 3, the network administrator goes to each client computer to operate the disk operating system (DOS) and then executes the Ghost recovery program at the client computer to recovery the data from the file F to the selected hard disk/partition.

Since the Ghost software backs up all the valid data stored in the hard disk, the data itself backed up by the Ghost software occupies an extremely large space in the hard disk. In addition, all data currently used by the file system of the operating system (OS) will be backed up into the file F. This occurs no matter whether such related data would be further changed in the future or not, thereby further occupying a great amount of space in the hard disk.

Another presently available backup/recovery software, such as the Goback software developed by Adaptec Corporation, needs the network administrator to go to the front of each client computer to operate it during recovery process. Prior to executing the recovery program, there is no need to boot the operating system (OS) in advance. Referring to FIG. 4, it illustrates a recovery flowchart of the conventional Goback software. As shown in FIG. 4, the network administrator goes to the front of each client computer to press the space key, indicates the system to initiate the recovery work, and then the Goback software recoveries the hard disk to selected state.

In light of the foregoing, there is a need in the art to provide a backup/recovery software with a remotely controlled function.

SUMMARY OF THE INVENTION

Accordingly, the present invention provides a network backup/recovery system and its method of backup/recovery that can backup/recovery the computer system instantaneously. An object of the present invention is to return at least one hard disk to a predetermined state. The improvement is remarkable for the backup/recovery system while the network administrator does not need to go to the front of each client computer to operate the computer system.

To achieve these and other advantages and in accordance with the purpose of the invention, as embodied and broadly described herein, the invention provides a method for backing up and/or recovering data.

One aspect of the present invention involves a network backup/recovery system for backing up data and recovering a storage device immediately. The system involves a client management part for controlling at least a client and a server management part for controlling a server and monitoring each using condition of the client. In this embodiment, the server management part sends a predetermined message to the client management part according to each using condition of the client, and the client management part involves implementing a predetermined backup/recovery procedure according to the received predetermined message.

In the preferred embodiment of the invention, the server may remotely control at least one backup/recovery operation of the client. The client management part executes a client management program at the client. The server management part executes a server management program at the server. The predetermined message includes a booting message of the client. The predetermined procedure includes issuing a command from the server to the client. The system determines and backs up a valid data being changed within established data stored in a hard disk. The server management part communicates with the client management part over the Internet. The system sends a backup-completed message when the changed valid data is backed up. The changed valid data is determined according to whether the established data has been used in a file system in an operating system. The valid data is contained in an allocated cluster within the file system. The file system is a FAT file system, a FAT32 file system, a NTFS system or an EXT2 file system for UNIX.

It is to be understood that both the foregoing general description and the following detailed description are exemplary, and are intended to provide further explanation of the invention as claimed.

BRIEF DESCRIPTION OF THE DRAWINGS

The above-mentioned objects and other objects and features of this invention and manner of attaining them will become apparent, and the invention itself will be understood by reference to the following description of the preferred embodiments of the invention taken in conjunction with the accompanying drawings, which are given by way of illustration only, and thus are not limitative of the present invention, and wherein.

DESCRIPTION OF THE PREFERRED EMBODIMENT

Figure 1:
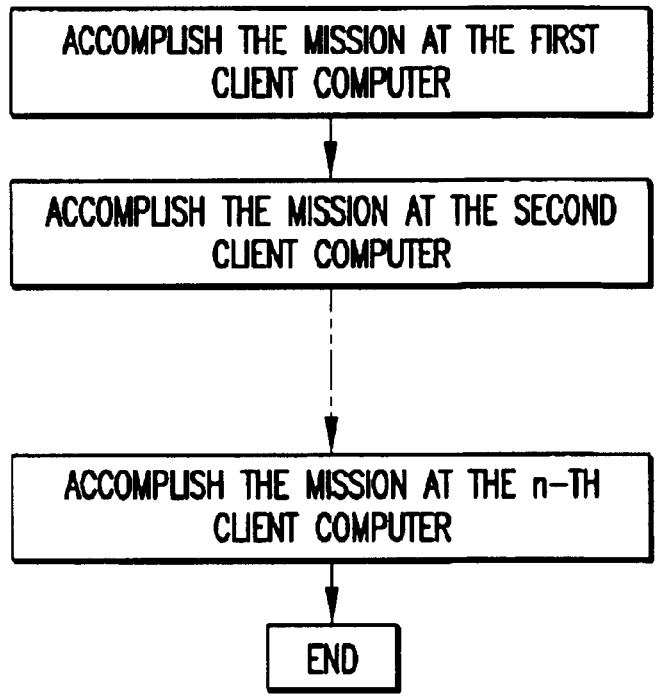
FIG. 1 (Prior Art) illustrates an operating flowchart of a conventional backup/recovery software, wherein the recovery function of the client computer is enabled.
Figure 2:
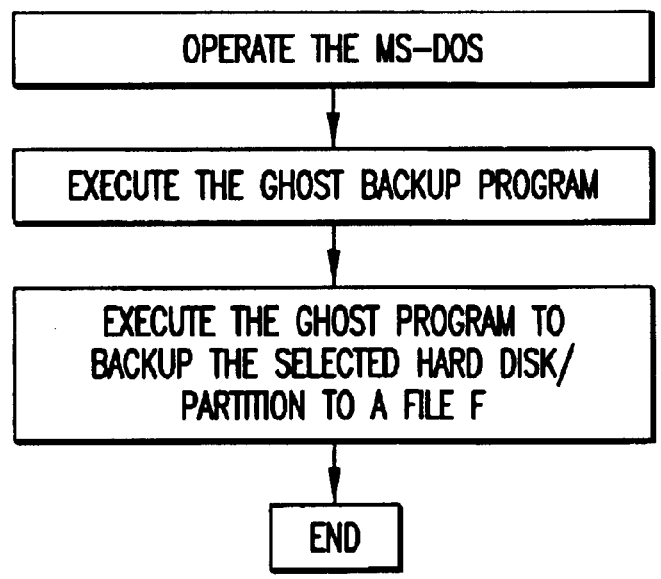
FIG. 2 (Prior Art) illustrates a backup flowchart of the Ghost software.
Figure 3:
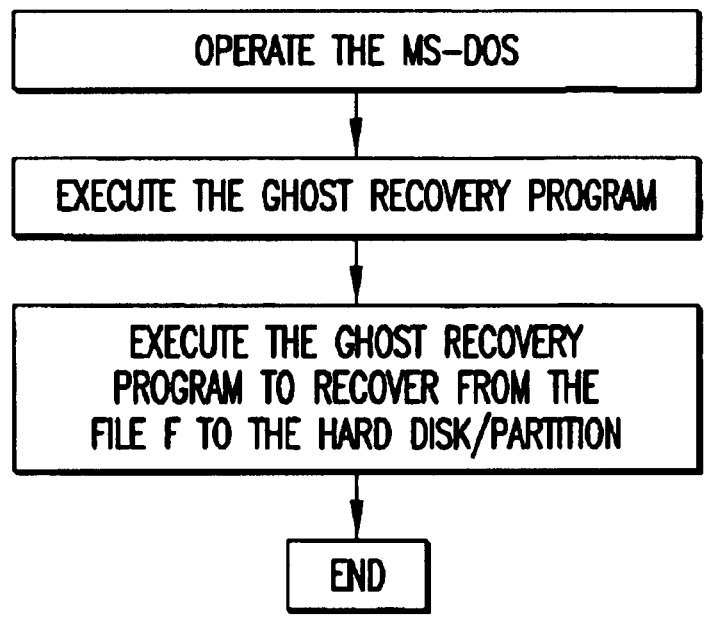
FIG. 3 (Prior Art) illustrates a recovery flowchart of the Ghost software.
Figure 4:
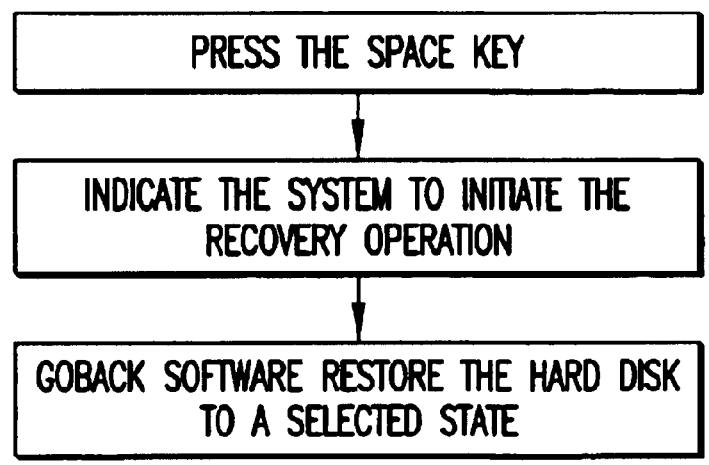
FIG. 4 (Prior Art) illustrates a recovery flowchart of the Goback software.

Reference will now be made in detail to the present preferred embodiments of the invention, examples of which are illustrated in the accompanying drawings. Wherever possible, the same reference numbers are used in the drawings and the description to refer to the same or like parts.

The present invention contemplates a network backup/recovery system to provide protection for the computer system by way of backup/recovery operation of the hard disk. The network backup/recovery system adopts a backup/recovery technique with a network function, which can greatly enhance the efficiency of the network administrator. In the preferred embodiment of the invention, the recovery operation is capable of just recovering a C diskette. The system sets up the C diskette to return to the previous state merely. Here is referred to the only C diskette, it being understood that the invention is capable of use in various other combinations and environments and is capable of changes or modifications within the scope of the inventive concepts as expressed hereunder.

The preferred embodiment of the present invention provides a network backup/recovery system for backing up data and recovering a storage device immediately. The system comprises a client management part and a server management part.

The client management part is used for controlling at least a client; the client management part is used for controlling a server and monitoring each using condition of the client.

The server management part sends a predetermined message to the client management part according to each using condition of the client, and the client management part involves implementing a predetermined backup/recovery procedure according to the received predetermined message.

The Internet maintains communication between the server management part and the client management part. The server may remotely control at least one backup/recovery operation of the client.

The client management part executes a client management program at the clients. The server management part executes a server management program at the server. The predetermined message includes a booting message of the client.

Figure 5:
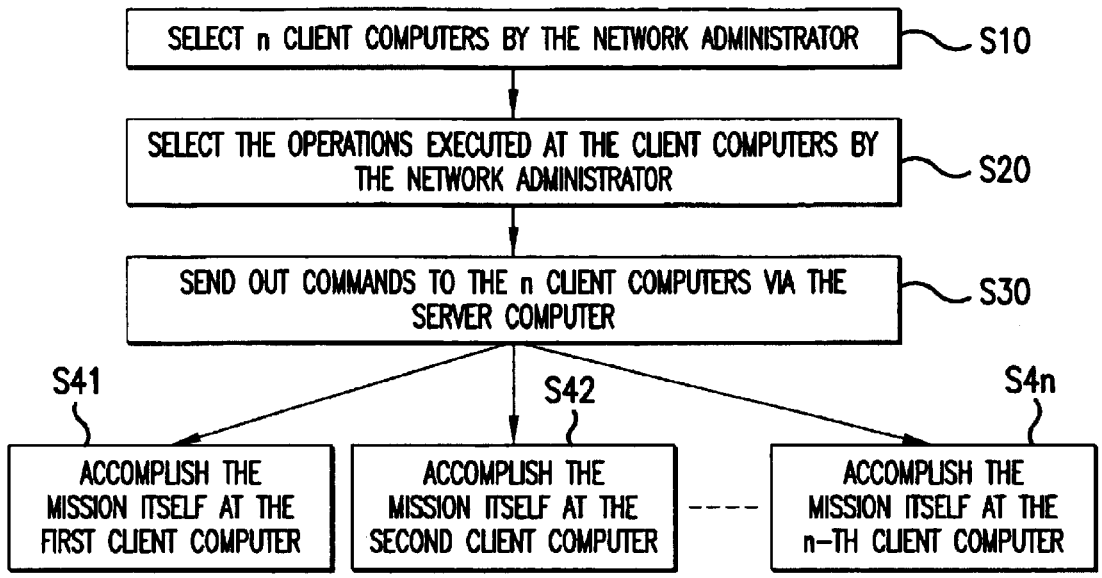
FIG. 5 illustrates an operating flowchart of a network backup/recovery system as an embodiment of the invention, wherein the backup/recovery function of the client computer is enabled.

FIG. 5 illustrates the operating flow chart of a network backup/recovery system as per an embodiment of the invention, wherein the backup/recovery operation of the client computer is enabled. The network backup/recovery system avoids the network administrator leaving his/her own location, but he/she is capable of enabling all kinds of backup/recovery operations of the clients via the server. Consequently, in this embodiment, the server may issue all kinds of control commands to the clients, and also can enable the backup/recovery operation of all or parts of the client computers. Referring to FIG. 5, all steps will be described in detail as follows.

Step S10, a first step, is to select n client computers by the network administrator. In this step, the selected n client computers are going to operate for enabling the backup/recovery operation.

Step S20, a second step, is to select the operations, such as enabling/disabling the recovery function, setting the backup/recovery command, and rebooting, by the network administrator. The selected operations are going to execute at the n client computers.

Step S30, a third step, is to send out commands to the n client computers via the server computer by the network administrator.

Step S41, a final step for the selected first client computer, is to receive the commands from the server computer. In this step, the selected first client computer accomplishes the mission itself.

Step S42, a final step for the selected second client computer , is to receive the commands from the server computer as well. In this step, the selected second client computer also accomplishes the mission itself.

Step S4n, a final step for the selected n-th client computer, is to receive the commands from the server computer. In this step, the selected n-th client computer accomplishes the mission itself similarly upon receiving the commands.

Please note that the n client computers may accomplish the mission itself in the meantime. Upon receiving the commands from the server computer, they accomplish the mission by their own. Presumes that executing the operations for each client computer needs 3 minutes, it also only needs3 minutes for n sets of client computer to accomplish the entire mission. The result of network backup and reconstruction is exactly the same with the network administrator himself operating at the client computers. That is why the efficiency of the network administrator can be enhanced.

In the preferred embodiment of the present invention, the predetermined procedure includes issuing a command from the server to the client. The system determines and backs up a valid data being changed within established data stored in a hard disk. The system sends a backup-completed message when the changed valid data is backed up. The changed valid data is determined according to whether the established data has been used in a file system in an operating system. The valid data is contained in an allocated cluster within the file system. The file system is a FAT file system, a FAT32 file system, a NTFS system, an EXT2 file system for UNIX, or the like.

Figure 6:
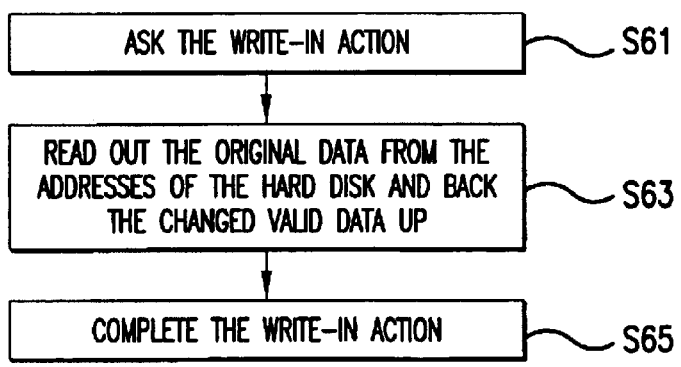
FIG. 6 illustrates a backup flowchart of a network backup/recovery system as an embodiment of the invention.

FIG. 6 illustrates the backup flowchart of a network backup/recovery system as an embodiment of the invention. Referring to FIG. 6, the backup operation is enabled. The backup operation is a spontaneous and sustained procedure. The user generally is not aware of executing backup operation owing to it is operated in the place out of application programs for the user interface. The process of backup is executing in the critical kernel portion therein operated the Window. The network backup/recovery system in the preferred embodiment of the present invention adds a processing program in the client kernel; accordingly, the network backup/recovery system can enable and/or disable at least one recovery operation at the client.

As shown in FIG. 6, step S61, a first step, is to ask the write-in operation from OS (such as Windows). The write-in operation is an operation for the application program writing in the hard disk.

Step S63, a second step, is to read out the original data from the addresses of the hard disk, which is asked to be written in data. Upon the original data being read out, the network backup/recovery system backs up the valid data being changed within the original data.

Step S65, a final step, is to send a backup-completed message to the computer system from the network backup/recovery system. The computer system receives the backup-completed message and writes in updating data to the hard disk.

The valid data is determined according to whether the data has been used in a file system in an operating system. The valid data is contained in an allocated cluster within the file system. The file system is a FAT file system, a FAT32 file system, a NTFS system or an EXT2 file system for UNIX.

Figure 7:
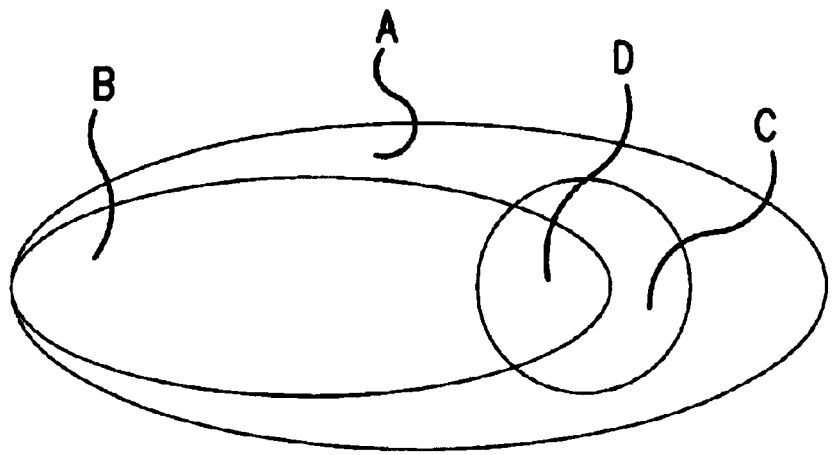
FIG. 7 is a schematic diagram of the hard disk space occupied by the backed-up data.

FIG. 7 is a schematic diagram of the hard disk space occupied by the backup data. As shown in FIG. 7, the oval area A represents data of an entire hard disk, the oval area B represents valid data of the hard disk, the oval area C represents changed data of the entire hard disk, and the oval area D is the area of the oval area B and the oval area C which occur simultaneously. The oval area D represents valid data being changed in the hard disk.

The conventional backup/recovery software, such as the Ghost software, backs up the data in the oval area B, whereas the network backup/recovery system as per an embodiment of the invention merely backs up the data in the oval area D. that is, the network backup/recovery system as an embodiment of the invention backs up the valid data being changed in the hard disk, hence backing up data by the invention takes up a extremely small space in the hard disk.

Figure 8:
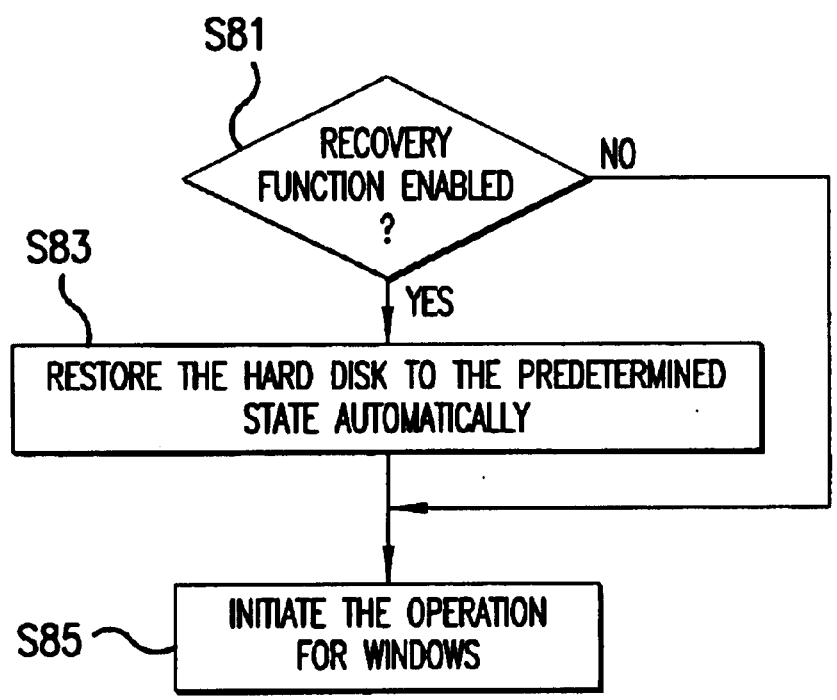
FIG. 8 illustrates a recovery flowchart of a network backup/recovery system as an embodiment of the invention.

FIG. 8 illustrates a recovery flowchart of a network backup/recovery system as an embodiment of the invention. With this invention, a lot of time can be saved . The recovery operation in the preferred embodiment of the invention is no need for the user to operate actively, so the user does not have to intervene. It is not necessary for booting the operating system (OS) prior to executing the recovery program.

As shown in FIG. 8, the recovery operation is enabled. The network backup/recovery system monitors each using condition of the client. While the network backup/recovery system monitors the client is on-line, then a predetermined message is sent to the client from the server. The predetermined message includes an issuing command for the client from the server. The command includes an instruction for enabling and/or disabling a recovery function of the clients. The client informs a kernel part operated on the computer system to enable and/or disable the recovery function upon receiving the command.

At the time the computer system starts up, the network backup/recovery system determines whether the clients enable and/or disable the recovery function or not, as shown in step S81.

At step S81, if at least one of the clients enables the recovery function, then go to step S83, otherwise go to step S85. At step S83, the client restores the entire hard disk or just the C diskette to the predetermined state automatically. Step S85, the final step, is to initiate the operation of the OS, such as Windows.

Based on the above-mentioned process, the disclosed network backup/recovery system has advantages listed below. First of all, if n computers need the network administrator to take over, and the functions operating in each client computers takes 3 minutes, then it takes3*n minutes is totally required for accomplishing the entire mission of all the client computers by using the conventional backup/recovery software. In contrast, by using the network backup/recovery system in the embodiment of the invention only 3 minutes are needed to accomplish the total mission. Therefore, comparing the efficiency, the rate of the two is 3*n/3=n. That is, the network backup/recovery system in the embodiment of the invention can enhance the efficiency to n times.

The recovery function is capable of providing recovery of only C diskette, thereby the C diskette returns to a previous state. Accordingly, system and application programs stored in the C diskette in general will never be destroyed or lost As to the data needs to be retained can be stored in the D diskette or in the E diskette. The method to recovery C diskette is capable of enhancing the flexibility of the application system.

While this invention has been particularly shown and described with reference to embodiments thereof, it will be understood by those skilled in the art that various changes in form and details may be made therein without departing from the spirit and scope of the invention as defined by the appended claims.

What is claimed is:

1. A network recovery system for backing up data and restoring a storage device to a previous state, said recovery system comprising:

a client management part for controlling at least one client; and a server management part for controlling a server and monitoring each using condition of said at least one client, wherein said server management part sends a predetermined message to said client management part according to said each using condition of said at least one client, said predetermined message comprising at least one predefined command, and said client management part involves implementing a predetermined backup/recovery procedure according to said received predetermined message, said predetermined backup/recovery procedure being performed within said at least one client.

2. The network recovery system as recited in claim 1, wherein at least one backup/recovery operation of said at least one client is remotely controllable by the server.

3. The network recovery system as recited in claim 1, wherein said client management part executes a client management program at said clients.

4. The network recovery system as recited in claim 1, wherein said server management part executes a server management program at said server.

5. The network recovery system as recited in claim 1, wherein said predetermined message includes a booting message for said clients.

6. The network recovery system as recited in claim 1, wherein said predetermined message includes a command issued from said server to said clients.

7. The network recovery system as recited in claim 1, wherein said system determines and backs up valid data being changed within established data stored in a hard disk.

8. The network recovery system as recited in claim 3, wherein said server management part communicates with said client management part over Internet.

9. The network recovery system as recited in claim 7, wherein said system sends a backup-completed message when said changed valid data is backed up.

10. The network recovery system as recited in claim 9, wherein said changed valid data is determined according to whether said established data has been used in a file system in an operating system, said changed valid data being stored in an allocated cluster within said file system, said file system being one of FAT file system, FAT32 file system, NTFS system, EXT2 file system for UNIX.

* * * * *